United States Patent [19]

Neuhaus

[11] Patent Number: 5,411,720
[45] Date of Patent: May 2, 1995

[54] METHOD AND DEVICE FOR THE SEPARATION AND CONVEYANCE OF GASES AND/OR OF GAS MOLECULE FRAGMENTS GENERATED BY DISSOCIATION ON SURFACES BY SURFACE DIFFUSION

[75] Inventor: Dietmar Neuhaus, Duesseldorf, Germany

[73] Assignee: Deutsche Forschungsanstalt fur Luft- und Raumfahft, e.V., Cologne, Germany

[21] Appl. No.: 940,910

[22] PCT Filed: Feb. 27, 1992

[86] PCT No.: PCT/EP92/00422

§ 371 Date: Nov. 3, 1992

§ 102(e) Date: Nov. 3, 1992

[87] PCT Pub. No.: WO92/15389

PCT Pub. Date: Sep. 17, 1992

[30] Foreign Application Priority Data

Mar. 6, 1991 [DE] Germany ............... 41 07 089.5

[51] Int. Cl.⁶ .................. C01B 13/00; B01D 61/00
[52] U.S. Cl. .......................... 423/210; 423/219; 423/579; 95/45; 95/54; 96/4
[58] Field of Search ............... 423/579, 210, 219; 422/191, 238, 239; 55/16; 95/45, 31, 54

[56] References Cited

U.S. PATENT DOCUMENTS

| | | | |
|---|---|---|---|
| 2,351,167 | 6/1944 | Ware | 423/219 |
| 3,232,026 | 2/1966 | McKinley | 55/16 |
| 3,359,705 | 12/1967 | Mullhaupt | 55/16 |
| 3,397,154 | 8/1968 | Talsma | 422/191 |
| 4,264,338 | 4/1981 | Null | 55/16 |
| 4,609,383 | 9/1986 | Bonaventura et al. | 55/16 |
| 4,806,132 | 2/1989 | Campbell | 55/16 |
| 4,828,817 | 5/1989 | Outlaw | 423/579 |
| 5,160,713 | 11/1992 | Mazanec et al. | 423/210 |
| 5,240,480 | 8/1993 | Thorogood et al. | 96/4 |
| 5,316,568 | 5/1994 | Brown | 95/31 |

FOREIGN PATENT DOCUMENTS

| | | |
|---|---|---|
| 199844 | 11/1986 | European Pat. Off. |
| 405288A1 | 1/1991 | European Pat. Off. |
| 428052A | 5/1991 | European Pat. Off. |
| 4119512 | 6/1991 | Germany |
| 63-248418 | 10/1988 | Japan ............ 94/45 |

OTHER PUBLICATIONS

"Kinetic istope effects for hydrogen diffusion in Bulk nickel on nickel surfaces" by Rice et al. J Chem Phys 92 (1) 1 Jan. 1990, pp. 775–791.

"The Basics of Membrane Permeation" by Robert N. Rickles and Henry Z. Friedlander; Chem. Eng. 25 Apr. 1966 163–168.

Primary Examiner—Gary P. Straub
Assistant Examiner—Timothy C. Vanoy
Attorney, Agent, or Firm—Spensley Horn Jubas & Lubitz

[57] ABSTRACT

A solid body having extremely narrow passages formed therein for the separation and conveyance of gases by surface diffusion. Because of the relatively high flow resistance resulting from the extremely small cross sections of the passages, the gas conveyance through the solid body can be performed substantially exclusively by surface diffusion. Only those gas particles which are adsorbed on the solid body or on the wall of the passages will be conveyed through the solid body. The surface diffusion can be controlled by suitable selection of the gas/solid body combination. The diffusion is influenced particularly by the temperature of the solid body. When, in the case of a two-gas mixture, the solid body is heated to a temperature above the desorption temperature of one of the gases and below the desorption temperature of the other gas, only the gas particles of the adsorbed gas are conveyed on the passage walls by surface diffusion.

24 Claims, 1 Drawing Sheet

METHOD AND DEVICE FOR THE SEPARATION AND CONVEYANCE OF GASES AND/OR OF GAS MOLECULE FRAGMENTS GENERATED BY DISSOCIATION ON SURFACES BY SURFACE DIFFUSION

BACKGROUND OF THE INVENTION

1. Field of the Invention

The invention is directed to a method and a device for the separation of gases in gas mixtures and of gas molecule fragments generated by dissociation on surfaces, by use of surface diffusion, and a method and a device for conveying such gases or gas molecule fragments by use of surface diffusion.

2. Description of Related Art

Methods and devices for the separation of gases by use of filters or with the help of centrifuges are known. Separation of gases by use of filters is substantially based on the fact that the filter has the gas mixture flowing therethrough while certain gases are retained by the filter whereas others flow through the filter. Separation of gases with the help of centrifuges, in contrast, is based on the mass differences of the gases to be separated. Occurences of surface diffusion do not play any role in either of the two methods. However, depending on the respective composition of the gas mixture, the separation of gases can be carried out very effectively by means of surface diffusion which with different gases takes place with varying speeds in dependence of the surface.

It is an object of the invention to provide a method and a device for the separation of gases and/or of gas molecule fragments generated by dissociation on surfaces by use of surface diffusion phenomena.

SUMMARY OF THE INVENTION

For solving the above object, there is proposed, according to the invention, a device wherein a solid body is used for a filter through which the gas is conveyed substantially exclusively by surface diffusion. The solid body is arranged in the outlet opening of a chamber for the gas mixture. The solid body is provided with a plurality of passages which either have been formed subsequently in the solid body or have been generated during manufacture of the solid body. The flow resistance generated by the passages of the solid body is set—by suitable selection of the cross sectional areas (primarily by selection of the size of the cross sectional areas; second, however, also by selection of the shape of the cross sectional area)—to such a value that the conveyance of the gas mixture through the solid body is substantially performed by surface diffusion on the inner face of the passages. Advantageously, the device of the invention is provided with a heater means for heating the solid body. The heating of the solid body can be effected by direct heat transmission from the heater means to the solid body but also by heat radiation.

It is generally acknowledged that the conveyance of gas through a solid body with passages formed therein (referred to as a substrate hereunder) can be performed in two ways. Gas conveyance is effected, on the one hand, by the gas flow through the passages and, on the other hand, by the surface diffusion of gas particles adsorbed on the passage walls. While the gas flow depends on the geometry of the passages, the conveyance of gas particles due to diffusion along the surfaces of the passage walls is determined by the substrate/adsorbate interaction. By suitable selection of the geometry of the passages (for instance, the passages have to be sufficiently narrow), the flow resistance which the gas flow is subjected to by the passages becomes so high that that portion of the gas conveyance which is caused by the gas flow is negligible, so that the gas conveyance through the solid body is substantially dominated by the surface diffusion of the gas particles. According to the invention, it is exactly such a gas-adsorbing solid body which is used for the separation of gases from gas mixtures. Gas conveyance through such a solid body can be controlled by selection of the substrate.

By the gas/subtrate combination, there is determined the substrate/adsorbate interaction. Further, however, the substrate/adsorbate interaction is a function of the substrate temperature. In case of different adsorbants on the substrate, there will also be different diffusion speeds on the substrate surface. Thus, the solid body used according to the invention, wherein the gas conveyance is performed almost exclusively by surface diffusion of the adsorbed gas particles, has different permeabilities for different gases. Since the properties of the particles of the different gases adsorbed on the solid body can be considerably influenced by the temperature of the solid body, the invention provides that the possibility of heating the solid body can be utilized for influencing the diffusion characteristics by suitable selection of the temperature and particularly by temperature distribution in the solid body.

It depends on the adsorption process which ones of the gas particles will be conveyed at which speed by surface diffusion. For example, it is possible that the adsorption of a molecule on the solid body will lead to immediate dissociation into "fragments" so that then the preferably saturated fragments are conveyed by surface diffusion and ultimately only the fragments will become desorbed again. In this case, it makes no difference whether the molecule or, however, the fragments of the molecule are contained in the gas mixture. Also, it is possible that at least part of the fragments, due to diffusion and prior to desorption, will return to the state of the original molecules which then will become desorbed. Further, it is possible that the fragments or some of the fragements will combine into new molecules which will become desorbed thereafter.

The properties of the substrate can be changed by (previously) adsorbed gases in such a manner that the adsorbed gases to be transported are influenced with respect to their diffusion properties, particularly with respect to their diffusion speed. By adsorption of a gas, the surface of the passages is changed. A gas coming into contact with this surface provided with adsorbed gas, does not "see" the "pure" solid body anymore but the solid body contaminated by the previously adsorbed gas. There will also occur other kinds of substrate/adsorbate interaction (in this case, the substrate corresponds to the solid body contaminated by the adsorbed gas) and thus different diffusion properties and speeds, which again can be utilized for the separation of the gases.

In an advantageous embodiment of the invention, it is provided that, with a gas mixture consisting of two gases, the solid body is heated to a temperature which is in the range between the desorption temperatures of the two gases. The gas conveyance through surface diffusion by use of the solid body provided by the invention can be performed only when the gas particles are adsorbed on the solid body. Thus, if it can be accomplished to adsorb specific particles of a gas mixture and at the same time desorb others or prevent them from adsorbing, the desorbed gas particles will be retained by the solid body. Notably, the gas conveyance of the desorbed gas particles through the solid body could take place only if the solid body allowed a gas conveyance caused by gas flow. Since this is practically excluded with the solid body used according to the invention, the solid body, by setting its temperature, can be brought into a condition wherein it is permeable to one gas (i.e. the adsorbed one) of the gas mixture while it is impermeable to the other gas of the gas mixture (i.e. the desorbed one). That gas of the gas mixture whose desorption temperature is lower than the selected solid body temperature, will become desorbed and be prevented from conveyance through the solid body; that gas whose desorption temperature is higher than the selected solid body temperature, can pass the solid body by surface diffusion.

In an advantageous embodiment of the invention, the solid body is provided in such a manner that only the particles of that gas which shall be extracted from the gas mixture will adsorb thereon, or, however, that the particles of all of the gases, except for the gas to be separated, will adsorb on the solid body. The properties of the solid body required therefor are primarily a matter of the "surface cleanliness or contamination". A solid body with a single-crystal surface has adsorption properties different from these of a solid body whose crystal surface is contaminated by foreign atoms.

Advantageously, the solid body comprises an inert material for thus ensuring repeatablity. As an inert material, there are preferably used catalytically acting metals, particularly platinum. The solid body itself is preferably provided as a sintered body, with the passages formed by the spaces between the particles of the sintered material. Thus, the solid body is preferably an "open-celled" body. However, the solid body can also be provided as a coil body and comprise a thin, structured, wound-up strip of material.

It is basically known that each inert (catalyst) material has its own specific adsorption, desorption and diffusion properties for gas molecules and gas molecule fragments. In the invention, these specific properties of the inert materials are made use of, notably depending on which gas molecules and/or fragments shall be separated or conveyed.

The gas mixture to be separated by the device of the invention and the method of the invention is not necessarily a mixture of gases wherein the atoms do not have identical nuclear-charge numbers. Instead, it is decisive that the gas mixture comprises gas particles with different adsorption and/or diffusion properties with respect to a substrate. Notably, the invention is also suited for performing e.g. isotope separation. By the different mass of the atoms of the isotopes, these are given different diffusion properties, and particularly different diffusion speeds so that the separation of an isotope gas mixture is made possible by the teaching of the invention.

Further, it is possible to use the herein described solid body for loading gas, or—if desired—a gas mixture, onto one of its outside faces. Also in this case, use is made of the above described different permeability properties of the solid body with respect to different gases. The gas supplied to the inlet end of the solid body is conveyed through the solid body only when it is adsorbed thereon so that it passes through the solid body due to surface diffusion and reaches the outlet end opposite the inlet end. Thus, the outlet end or the outlet face of the solid body is "loaded" with the gas passing through the solid body. An advantage in this regard is observed in that the loading of the outlet face of the solid body (solid body surface) takes place "from within" and not at all by an outer supply of gas onto the solid body surface e.g. by exposing the outlet face of the solid body to a gas atmosphere so that gas will adsorb thereon. By means of energy supply, e.g. by electrone bombardment, the gas on the outlet face of the solid body can be detached therefrom.

The above described method can be advantageously used in a source of atomic oxygen. The inlet end of the solid body is subjected to an oxygen atmosphere. The temperature of the solid body is set in such a manner that the oxygen is dissociated and the thereby generated atomic oxygen is adsorbed. Thus, the temperature of the solid body is larger than the value required for oxygen dissociation (ca. 150 K for a solid body of platinum); a further precondition is that the temperature is larger than the desorption temperature of molecular oxygen and smaller than the temperature of atomic oxygen. Consequently, only the atomic oxygen reaches the outlet end of the solid body by surface diffusion for loading the outer face thereof with atomic oxygen. By bombardment with an electrode gun (power ca. 200 eV), the atomic oxygen can be detached from the outer face of the solid body. Thus, atomic oxygen deposits on the outlet end of the solid body without the necessity that the space adjacent the outlet end includes atomic oxygen. Therefor, the above method is suitable for realizing a source for atomic oxygen adapted for continuously running operation.

Further, the invention is directed to a method and a device for the conveyance of gas or gas molecule fragments from a first chamber into a second chamber by surface diffusion.

According to the invention, the device is characterized by a gas-adsorbing solid body dividing the two chambers from each other, said solid body comprising an inlet end connected to the first chamber and an outlet end connected to the second chamber, and having formed therein a plurality of passages connecting the two chambers, the flow resistances of the passages—due to suitable selection of the cross-sectional areas—being so high that gas conveyance through the solid body is performed substantially exclusively by surface diffusion, with a heater means being provided for heating the solid body at different temperatures when viewed in the direction of gas conveyance, the temperature of the solid body being higher at the inlet end than at the outlet end. The features of the method of the invention for conveyance of gas from a first chamber into a second chamber by surface diffusion are indicated in claim 6.

In the method and the device for the conveyance of gas by surface diffusion, there is used—as in the above described inventive separation of gas mixtures—a gas-adsorbing solid body whose properties and arrangements have already been detailedly explained above in connection with the description of the separation of the gas mixture.

The conveyance of gases and/or of gas molecule fragments by surface diffusion through the solid body is caused exclusively by subjecting the solid body to a temperature gradient. This temperature gradient is based on the fact that, in case of a given coverage of the solid body or substrate with gas particles, the equilibrium pressure of the gas phase is a function of the temperature. In a reverse manner, at an identical ambient pressure, also the coverage of the substrate with gas particles is a function of the temperature. Normally, in case of constant coverage of the substrate with gas particles, the equilibrium pressure increases with rising temperature, i.e. the coverage will decrease as the temperature rises. This effect can be utilized for the conveyance of gas through the solid body. Notably, the particles of the gas to be conveyed will adsorb at the cooler inlet end of the solid body. The adsorbed gas particles are conveyed by surafce diffusion through the solid body to the warmer outlet end where they will desorb because of the higher temperature. The pressure of the gas in the second chamber joining the outlet end is higher than in the first chamber facing to the inlet end since the equilibrium pressure on the warm outlet end is larger than the equilibrium pressure at the comparatively cool inlet end. Thus, when the gas is conveyed, it is subjected to a higher pressure so that the gas conveyance is performed in a "pump-like" manner. The temperature gradient imposed on the solid body is selected in such a manner that the gas is adsorbed at the inlet end of the solid body and is desorbed at the outlet end.

According to the herein explained method and devices—their features being also detailedly indicated in the claims—the above described solid body can be employed for the separation of gasses in gas mixtures, for the pumping of gas and gas molecule fragments, as well as for the effective loading of a surface (outlet face of the solid body) with gas molecules or fragments thereof. The respective gases must adsorb on the solid body for being able to pass through the solid body by surface diffusion. If gas molecule fragments have to be conveyed, the adsorption is accompanied by a dissociation unless the gas molecule fragments are already existing in this form in the gas supplied to the solid body.

BRIEF DESCRIPTION OF THE DRAWINGS

An embodiment of the invention will be described in greater detail hereunder with reference to the drawings.

DESCRIPTION OF THE PREFERRED EMBODIMENTS

Figure 1:
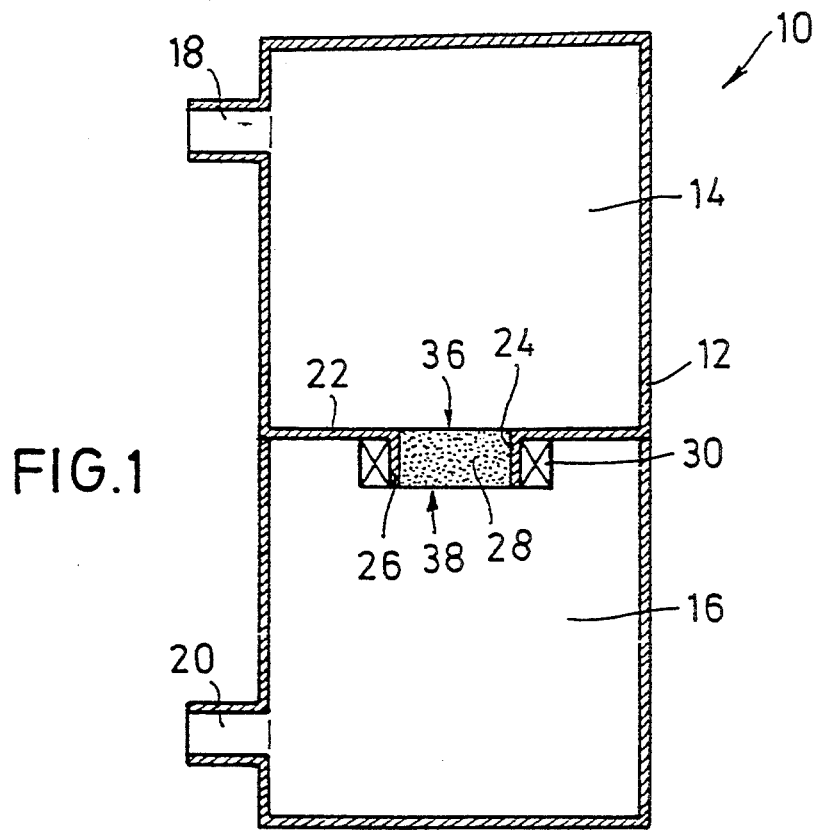
FIG. 1 is a schematical view of a device for the separation of gases in a gas mixture and for the conveyance of gas.

FIG. 1 shows a sectional view of a device 10 for the separation of gases. The device 10 comprises a housing 12 with two chambers 14,16 formed therein. In the region of the first chamber 14, the housing 12 is provided with a gas inlet opening 18 while a gas outlet opening 20 is provided in the region of the second chamber 16 in the housing 12. Within housing 12, there is arranged a dividing wall 22 for dividing housing 12 into said two chambers 14,16. The dividing wall 22 has an opening 24 formed therein. A collar 26 surrounding the opening 24 is formed to dividing wall 22 in the manner of a nozzle. This nozzle has its complete length filled with a solid body 28 extending over the complete cross section of the nozzle and of the opening 24. Outside of the nozzle, there is arranged a heater means 30 for heating the solid body 28. The heater means comprises a plurality of individually controllable heater elements for heating the solid body 28 to different degrees in different regions. Thus, the heater means 30 is suited for subjecting the solid body 28 to a specific temperature profile, e.g. a temperature gradient, when viewed in the flow direction of the gas.

Figure 2:
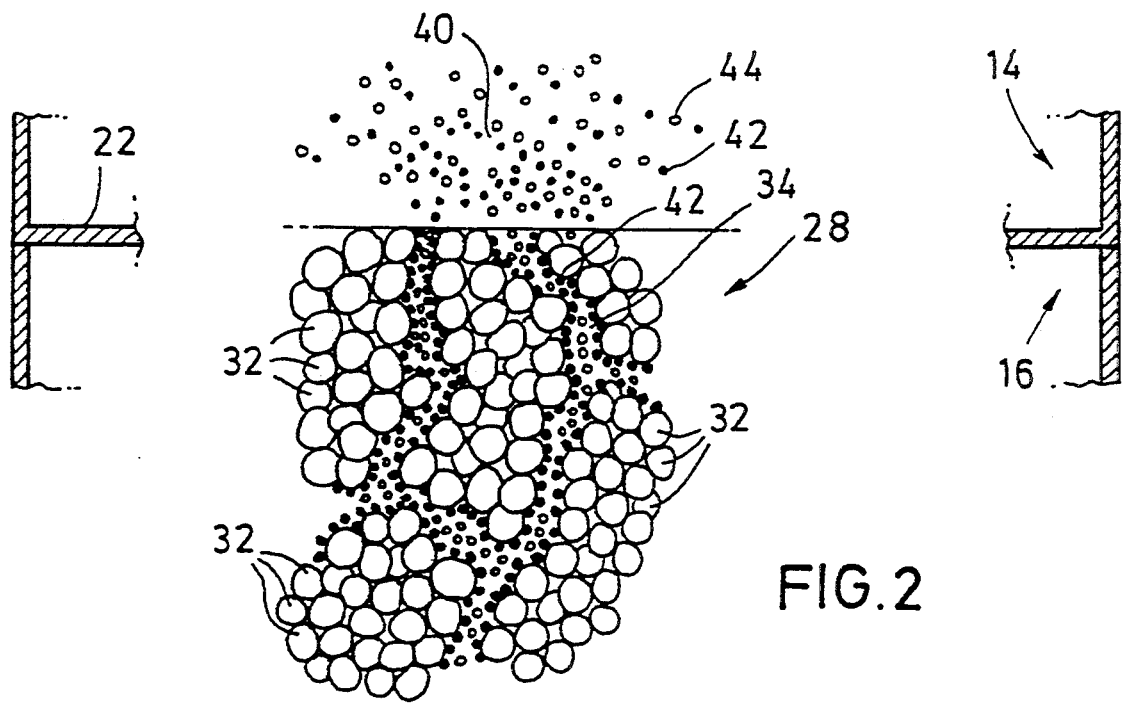
FIG. 2 is a view, at a considerably enlarged scale, of the solid body of sintered material used in the device shown in FIG. 1.

As can be seen from FIG. 2, the solid body 28 is a sintered body. The sintered material is platinum. Between the platinum particles 32, there are formed passages 34 passing through the solid body 28 like channels from the inlet end 36 facing chamber 14 to the outlet end 38 facing chamber 16. The passages 34 connect the two chambers 14 and 16 to each other. The passages 34 are generated during the sintering of the particles 32 and have an extremely small cross-sectional area. Due to this extremely small cross-sectional area and the geometry, the passages 34 provide an extremely high flow resistance for a gas or gas mixture flowing into chamber 14.

As evident from FIG. 2, gas conveyance through the passages 34 of the solid body 28 takes place almost exclusively by diffusion of gas particles 42 adsorbed on the sintered platinum particles 32 of solid body 28 along the inner face of the walls of the passages 34 (surface diffusion); in any case, the gas conveyance by surface diffusion by far dominates the gas conveyance by gas flow. As illustrated in FIG. 2, the gas mixture 40 introduced into chamber 14 via inlet opening 18 comprises gas particles 42 (black dots) and gas particles 44 with different desorption temperatures. The heater means 30 heats the solid body 28 to a temperature at which the gas particles 42 are adsorbed on the inner faces of the passage walls while the gas particles 44 are desorbed. Thus, the temperature of the solid body 28 lies between the desorption temperature of the gas particles 44 and that of the gas particles 42. Due to its very small and narrow passages 34, the solid body 28 provides a high flow resistance for the desorbed gas particles 44 whereby the desorbed gas particles 44 practically do not pass the solid body 28 and do not enter the chamber 16 when the gas mixture 40 is pressurized for being introduced into chamber 14 and is pressed through solid body 28. Through solid body 28, there are conveyed the gas particles 42 adsorbed on the sintered particles 32, which—because of the higher pressure of the gas mixture 40 in chamber 14 as compared to chamber 16—pass through the solid body by surface diffusion on the passage walls and enter chamber 16. By increasing the temperature of solid body 28 at its outlet end up to above the desorption temperature of the gas particles 42, these become detached from solid body 28 for being freely floating in chamber 16 and being discharged from chamber 16 via outlet opening 20. Thus, a gas, i.e. the gas particles 42, has been separated from the gas mixture 40 contained in chamber 14.

The device for the separation of gases in gas mixtures shown in FIG. 1 can also be used for conveying or pumping gases from the chamber 14 into the chamber 16. To this purpose, the solid body 28 is subjected to a temperature gradient by the heater means 30, with the inlet end 36 being heated to a low first temperature at which the gas particles to be conveyed will adsorb on the passage walls, and the outlet end 38 being heated to a higher temperature which is above the desorption temperature of the gas particles to be conveyed. The gas in the chamber 14 adsorbs on the solid body 28 in the region of its inlet end 36 and is conveyed by diffusion along the passage walls on the surfaces of adjacent sintered particles 32 up to the outlet end 38 where, due to the higher temperature, it is desorbed and enters chamber 16. Since with a constant coverage of the passage walls with gas particles the equilibrium pressure of the gas phase will rise with increased temperature, the gas in the chamber 16 has a higher pressure than the gas in the chamber 14. In so far, the device 10, when used for conveyance of a gas, can be compared to a (gas) pump.

I claim:

1. A device for the separation by surface diffusion of a gaseous mixture comprising at least one of a gas and a gas molecule fragment, the device comprising:
   a chamber for the mixture, the chamber defining an outlet opening,
   a gas-adsorbing solid body arranged in the outlet opening, the solid body having a plurality of passages formed therein through which at least one of the gas and the gas molecule fragment is conveyable, each of the plurality of passages defining a surface, a cross sectional area and a flow resistance, the cross sectional area being selected such that the flow resistance has a value at which the conveyance of the at least one of the gas and the gas molecule fragment through the solid body is essentially performed by diffusion along the surface of the passage, and
   heater means for heating the solid body.

2. The device of claim 1, wherein
   the mixture comprises at least one of a first gas and a first gas molecule fragment and at least one of a second gas and a second gas molecule fragment,
   the at least one of a first gas and a first gas molecule fragment has a first desorption temperature,
   the at least one of a second gas and a second gas molecule fragment has a second desorption temperature, and
   the heater means comprises means for heating the solid body to a temperature which is less than the first desorption temperature and greater than the second desorption temperature,
   thereby enabling the at least one of a first gas and a first gas molecule fragment to be conveyed through the solid body.

3. The device of claim 1, wherein
   the mixture comprises at least one of a first gas and a first gas molecule fragment and at least one of a second gas and a second gas molecule fragment,
   the at least one of a first gas and a first gas molecule fragment has a first diffusion speed along the surface of the passages,
   the at least one of a second gas and a second gas molecule fragment has a second diffusion speed along the surface of the passages, and
   the heater means comprises means for heating the solid body to a temperature which causes the first and second diffusion speeds to be unequal.

4. The device of claim 1, wherein
   the mixture comprises at least one of a first gas and a first gas molecule fragment and at least one of a second gas and a second gas molecule fragment,
   the at least one of a first gas and a first gas molecule fragment has a first diffusion speed along the surface of the passages,
   the at least one of a second gas and a second gas molecule fragment has a second diffusion speed along the surface of the passages, and
   the solid body comprises a material for causing the first and second diffusion speeds to be unequal.

5. A method for the separation by surface diffusion of a gaseous mixture comprising at least one of a first gas and a first gas molecule fragment and at least one of a second gas and a second gas molecule fragment, the method comprising:
   providing a gas-adsorbing solid body,
   forming a plurality of passages in the solid body through which at least one of the first gas and the first gas molecule fragment and at least one of the second gas and the second gas molecule fragment is conveyable, each of the plurality of passages defining a surface, a cross sectional area and a flow resistance,
   selecting the cross sectional areas of the passages such that the flow resistance has a value at which the conveyance of the at least one of the first gas and the first gas molecule fragment and the at least one of the second gas and the second gas molecule fragment through the solid body is essentially performed by diffusion along the surface of the passages, and wherein the at least one of the first gas and the first gas molecule fragment has a first diffusion speed along the surface of the passages, the at least one of a second gas and a second gas molecule fragment has a second diffusion speed along the surface of the passage, and the first and second diffusion speeds are unequal.

6. The method of claim 5, comprising heating the solid body.

7. The method of claim 6, wherein the at least one of a first gas and a first gas molecule fragment has a first desorption temperature, the at least one of a second gas and a second gas molecule fragment has a second desorption temperature, and wherein the step of heating the solid body comprises the step of heating the solid body to a temperature which is less than the first desorption temperature and greater than the second desorption temperature.

8. The method of claim 6, wherein the step of heating the solid body comprises the step of heating the solid body to a temperature which causes the first and second diffusion speeds to be unequal.

9. The method of claim 5 comprising the step of desorbing at least one of the gas molecule fragments and compounds of the gas molecule fragments after conveyance of the gas molecule fragments through the solid body.

10. The method of claim 5, comprising the step of modifying the surface of the passages by absorption of at least one of the gas and gas molecule fragments to thereby influence the diffusion characteristics of the at least one of the gas and gas molecule fragments to be conveyed through the solid body.

11. The method of claim 5 wherein the solid body comprises inert material.

12. The method of claim 5 wherein the solid body comprises a catalyst material.

13. The method of claim 5 wherein the solid body comprises platinum.

14. The method of claim 5 wherein the solid body comprises a sintered body having a plurality of substantially granular particles defining spaces therebetween, and wherein the passages are formed by the spaces between the plurality of particles.

15. The method of claim 5 wherein the solid body comprises a coil body having a thin, structured, wound-up strip of material.

16. The method of claim 5, wherein the step of providing a gas-adsorbing solid body comprises the step of providing a gas-absorbing solid body made of a material which causes the first and second diffusion speeds to be unequal.

17. A method for loading a surface with at least one of a gas and a gas molecule fragment generated by dissociation on surfaces, comprising:
conveying at least one of the gas and the gas molecule fragments through a gas-adsorbing solid body having a plurality of passages formed therein, the solid body defining an outer surface and each of the plurality of passages defining a surface and a cross-sectional area,
selecting the cross-sectional areas of the passages so that the conveyance of the at least one of the gas and the gas molecule fragments through the solid body is performed essentially by diffusion along the surface of the passages and the at least one of the gas and the gas molecule fragments accumulate on the outer surface of the solid body, and
heating the solid body.

18. The method of claim 17, comprising the step of detaching at least one of the gas and the gas molecule fragments accumulated on the outer surface of the solid body from the outer surface of the solid body by an external energy supply.

19. The method of claim 18, wherein the step of detaching comprises the step of subjecting the outer surface of the solid body to electron bombardment.

20. A method for the conveyance of gas molecule fragments through a solid body, comprising
adsorbing the gas molecule fragments on the solid body,
dissociating the gas molecule fragments from individual gas molecules, the step of adsorbing the gas molecule fragments and the step of dissociating the gas molecule fragments occurring substantially simultaneously,
forming a plurality of passages in the solid body, each of the plurality of passages defining a surface and a cross-sectional area,
selecting the cross-sectional areas of the passages so that the conveyance of the gas molecule fragments is performed essentially by diffusion along the surface of the passages.

21. The method of claim 20, comprising the step of desorbing at least one of the gas molecule fragments and compounds of the gas molecule fragments after conveyance of the gas molecule fragments through the solid body.

22. The method of claim 20 wherein the gas molecule fragments comprise saturated gas molecule fragments.

23. A device for the conveyance of a gas from a first space to a second space by surface diffusion, the gas being adsorbable on a surface and disintegratable into gas molecule fragments by dissociation, the device comprising:
a gas-adsorbing solid body interposed between the first space and the second space, the solid body comprising:
an inlet end in communication with the first space,
an outlet end in communication with the second space,
a plurality of passages in communication with the first space and the second space, at least one of the gas and the gas molecule fragments being conveyable through the plurality of passages, each of the plurality of passages defining a surface, a cross sectional area and a flow resistance, the cross sectional area being selected so that the flow resistance has a value at which the conveyance of at least one of the gas and the gas molecule fragments through the solid body is essentially performed by surface diffusion, and
heater means for heating the inlet end of the solid body to a first temperature for adsorbing the gas to be conveyed, and for heating the outlet end of the solid body to a second temperature for desorbing at least one of the gas and the gas molecule fragments conveyed by surface diffusion, the first temperature being lower than the second temperature.

24. A method for the conveyance of a gas from a first space to a second space by surface diffusion, the gas being adsorbable on a surface and disintegratable into gas molecule fragments by dissociation, the method comprising:
interposing a gas-adsorbing solid body between the first space and the second space,
providing the solid body with an inlet end in communication with the first space,
providing the solid body with an outlet end in communication with the second space,
providing the solid body with a plurality of passages in communication with the first space and the second space, at least one of the gas and the gas molecule fragments being conveyable through the plurality of passages, each of the plurality of passages defining a surface, a cross sectional area and a flow resistance,
selecting the cross sectional area so that the flow resistance has a value at which the conveyance of at least one of the gas and the gas molecule fragments through the solid body is performed by surface diffusion,
heating the inlet end of the solid body to a first temperature for adsorbing the gas to be conveyed, and
heating the outlet end of the solid body to a second temperature for desorbing at least one of the gas and the gas molecule fragments conveyed by surface diffusion, the first temperature being lower than the second temperature.

* * * * *